Dec. 29, 1970   W. STRAUSS   3,550,207
SPRUE BUSHING PURGE PORT FOR INJECTION MOLDING MACHINE
Filed Oct. 15, 1968   2 Sheets-Sheet 1

INVENTOR
WILLIAM STRAUSS
BY
Stanley Bilker
ATTORNEY

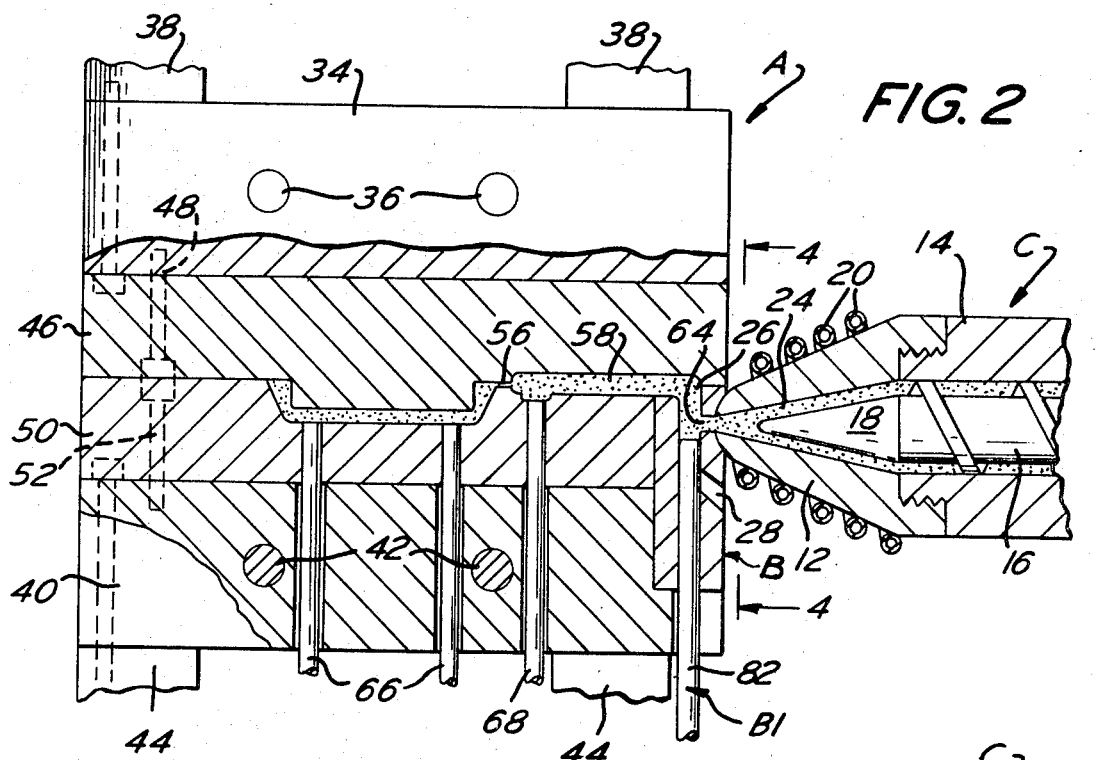
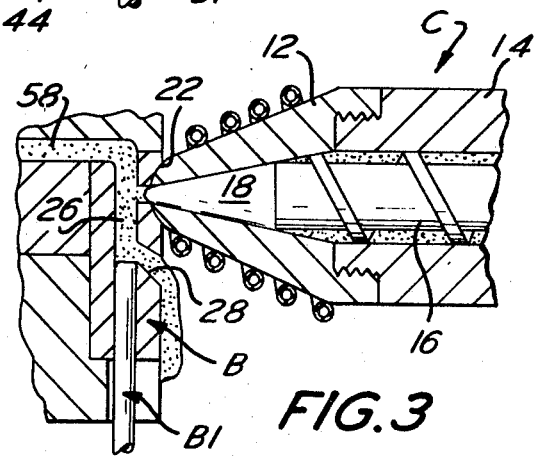
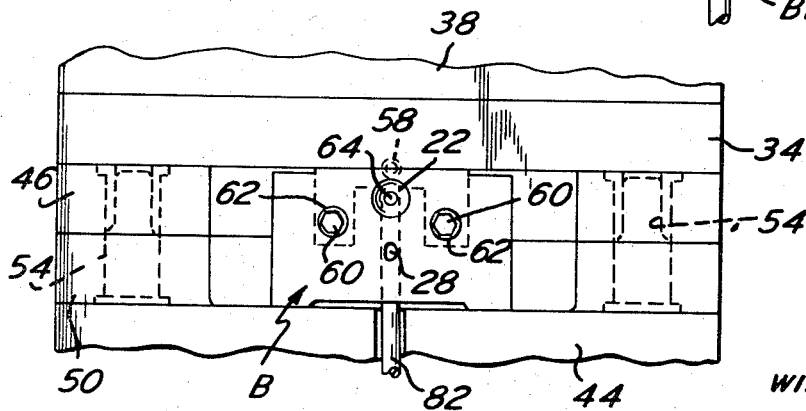
INVENTOR
WILLIAM STRAUSS
ATTORNEY

United States Patent Office 3,550,207
Patented Dec. 29, 1970

1

3,550,207
SPRUE BUSHING PURGE PORT FOR INJECTION MOLDING MACHINE
William Strauss, Huntingdon Valley, Pa., assignor to Pennwalt Corporation, a corporation of Pennsylvania
Filed Oct. 15, 1968, Ser. No. 767,692
Int. Cl. B29f 1/00
U.S. Cl. 18—30                                          8 Claims

ABSTRACT OF THE DISCLOSURE

A sprue bushing for an injection molding machine in which a valve-actuated purge port is incorporated in spaced disposition with the sprue orifice. When the port is closed, a shot of plastic material may be injected under full pressure into the mold cavities. After the cavities have been charged, the valve is opened allowing the cushion of material in the nozzle in front of the injection screw to escape and drool from the port.

This invention relates to injection molding apparatus, and more particularly, relates to a means for preventing build-up of thermosetting material within the nozzle of an in-line extrusion cylinder.

With in-line injection molding equipment, a prepared shot of plasticized material, which has been loaded by the screw into a forward portion of the extrusion cylinder, is injected directly from the nozzle into the mold cavity by way of passageways in separable mold sections. During recent years, the simpler in-line injection molding equipment has been used for thermosetting materials, as well as for thermoplastics. However, in order to assure complete filling of the mold cavities on in-line injection molding machines, an excess charge is prepared beyond that which would be required to fill the mold cavities and passageways leading thereto. That is, the size of the shot loaded into the extrusion cylinder in advance of the screw is intentionally greater than the actual volumetric charge requirements of the molded parts and runners by some predetermined amount which acts as a cushion.

One of the reasons for preparing a charge greater than the minimum required just to fill the mold and passageways, is to overcome small variations in density of the molding compound being fed to the screw. For example, raw molding compounds, such as phenolic, urea, melamine, etc., are supplied in powder form and slight variations in the ratio of fines to granules in batch to batch, or even with a given batch, can in turn cause variations in the density of the preheated material prepared by the screw. As the screw is set to prepared a fixed volume of preheated material to make good dense moldings every cycle, the volume of preheated material prepared must be sufficiently large as to assure not exhausting the supply available prior to the complete filling of the mold cavities during injection of a batch of least dense material. Accordingly, when the screw controls are set to accommodate the lowest density expected, then on other cycles when slightly denser material is preheated, it results in a greater cushion of material remaining in front of the screw at completion of the injection stroke.

Still other reasons for cycle-to-cycle density variation in the preheated charge are attributable to the nature of extrusion screws. That is, minor variations in temperature control, in screw back pressure and in slippage rate while the screw is rotating, all affect density and temperature of the preheated material. In addition, when the screw is thrust forward for injection, the density of the preheated material plus slippage of some of the preheated material back along the screw flights also produces cycle-to-cycle variation in the amount of cushion material

2 remaining between the tapered screw tip and the matching taper of the interior nozzle wall.

Since the screw has deliberately prepared more than can be injected, it cannot advance to the full forward position of its stroke during injection. Accordingly, after the mold cavities are filled, a cushion or skin of plastic material is compressed between the tapered tip of the screw and the matching taper of the nozzle wall. The depth of this cushion may vary from $\frac{1}{16}$ inch to $\frac{1}{4}$ inch depending upon the material density.

Where thermosetting materials are being injected, the densely packed layer or cushion of material on the tapered interior nozzle wall is likely to undergo a further state of cure with each succeeding injection cycle. Where set-up or hardening of the cushion occurs such as to cause an increase in thickness of the skin, it is obvious that successive shots will become smaller in volume and eventually result in short shots insufficient to charge the mold cavities. However, the usual consequences of setting up of the cushion of thermosetting material in the nozzle is complete plugging of the nozzle orifice so as to obstruct further injection. Thereafter, the machine must be shut down, the nozzle removed, and the hardened plug removed. Of course, short shots and nozzle plugging result in lost production.

Some molders force this extra cushion material into the mold itself. Where the injection pressure is sufficiently high, the mold opens slightly against its locking or clamping pressure, and the excess material flashes over the mold parting line in order to escape. However, this procedure produces a solid flash across the face of the mold. Therefore, such a procedure may result in dimensional inaccuracies in the molded part, or, at the very least, it requires an additional operation to remove the flash from the part.

Another method has been to pull back the injection cylinder nozzle from abutment with the sprue bushing and purge the nozzle by permitting the material to drool into the open space. This method creates the additional problem of requiring the cylinder nozzle to press or squeeze out the drooled material when returned into abutting contact with the sprue bushing each time. As a consequence, there is also a likelihood of building up a coating of hardened film which can mask the nozzle-to-sprue bushing interface.

Still another method is to incorporate a scraper on the nose of the injection screw as shown in my prior copending patent application, Ser. No. 567,661, filed July 25, 1966 now Pat. No. 3,427,639. After injection has been effected and before the subsequent cycle, the screw is rotated in the reverse direction and the excess material drilled back onto the screw flights. While this is a most effective system for "purging," it is somewhat more expensive to utilize a reversing motor drive.

In the present method, the material is squeezed or drooled out from the sprue bushing without retracting the nozzle from its abutting contact therewith. A port or channel extends through the sprue bushing below the injection nozzle and joins with the passageway or sprue orifice from behind. During the main portion of the injection cycle, a pin closes off the passage's communication with the port so that the shot is injected into the mold cavity under full pressure. However, when it is desired to purge the cushion, the pin or piston is retracted from the closed position to the open whereby the excess material is expelled through the port to the exterior.

It is therefore an object of this invention to provide a simple and effective means for purging an injection nozzle of its residual cushion of material subsequent to the injection shot.

Another object of this invention is to provide a valved sprue bushing purge port through which excessive material may be flushed without retracting the nozzle from the bushing.

Yet a further object of this invention is to provide a valved sprue bushing purge means for an injection molding apparatus wherein the valve closure means also may function to strip out the sprue from the previous shot.

Still a further object of this invention is to provide a purging means for an injection molding apparatus which will produce minimum flash.

Other objects of this invention are to provide an improved device of the character described which is easily and economically produced which is sturdy in construction, and highly efficient in operation.

With the above and related objects in view, this invention consists of the details of construction and combination of parts as will be more fully understood from the following detailed description when read in conjunction with the accompanying drawings in which:

FIG. 2 is an enlarged fragmentary sectional view showing the extrusion nozzle in abutment with the sprue bushing of this invention and the reciprocable-rotatable screw in injection position.

FIG. 3 is an enlarged fragmentary sectional view similar to FIG. 2, but with the valve-actuated purge port in open position within the sprue bushing.

FIG. 4 is an elevational view taken generally along lines 4—4 of FIG. 2 but with the extrusion cylinder removed.

Figure 1:
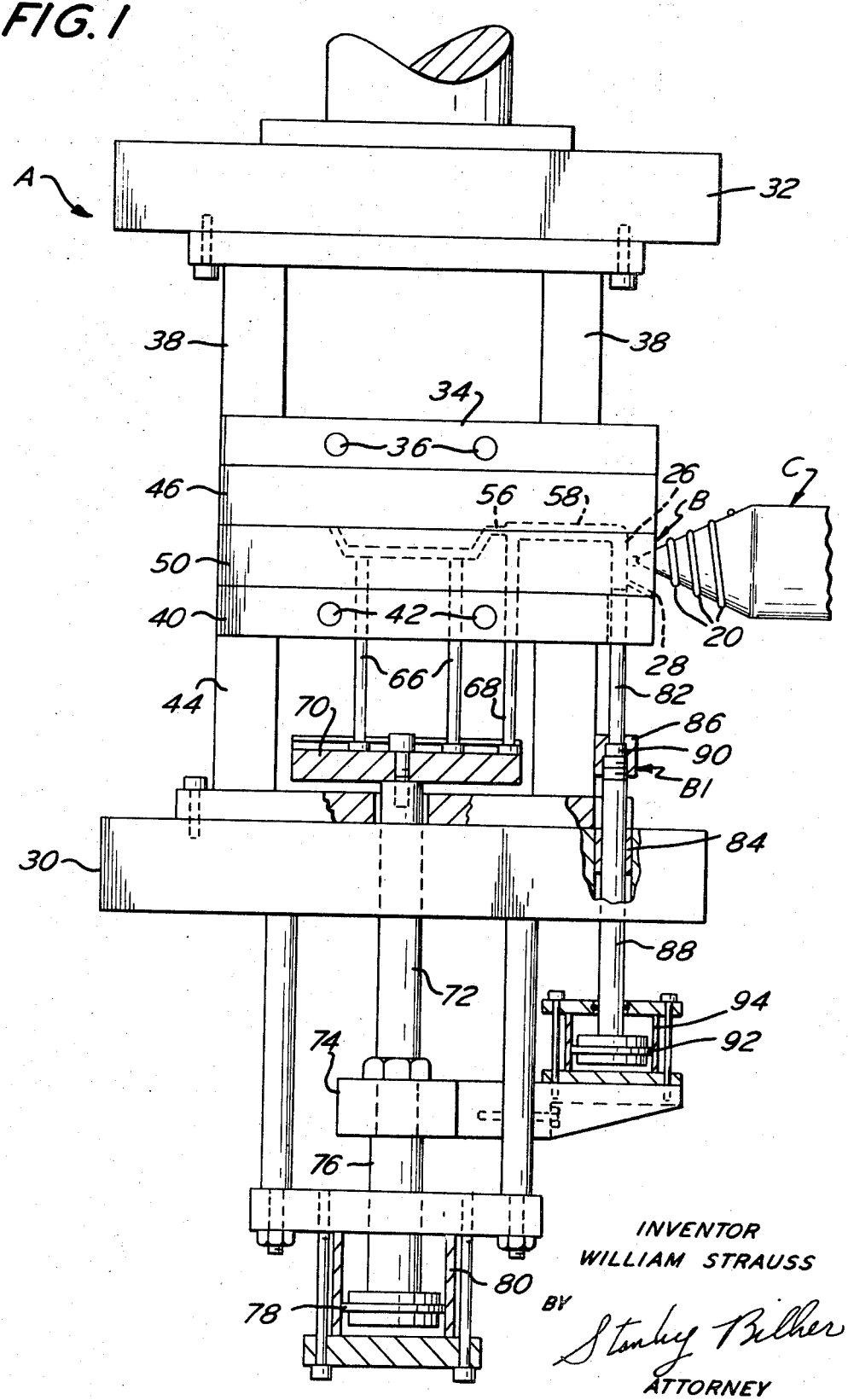
FIG. 1 is a side elevational view, and partly in section, of an in-line injection molding apparatus embodying this invention.

Referring now in greater detail to the drawings in which similar reference characters refer to similar parts, there is shown an in-line vertical press, generally designated as A, and a valved-sprue bushing B affixed to the stationary mold half to permit purging of the cushion of thermosetting material within the nozzle of injection cylinder C.

In order to focus maximum attention on the very simple details of construction of the sprue bushing B, only the very bare essentials of the injection cylinder C are illustrated. The cylinder includes a nozzle 12 threadedly mounted at the end of barrel 14. A rotatable-reciprocable screw 16 is axially supported within the barrel 14 and has a tapered nose portion 18 adapted to be thrust forward into the complementary tapered bore of the nozzle 12. Heating or cooling elements, such as coil 20, encircle the periphery of the nozzle 12 and the barrel 14 to control material temperature. The exterior end of the nozzle 12 adjacent its orifice is abutted against a concave or dished surface 22 of the sprue bushing B. Rotation of the screw 16 feeds a charge of plastic material through barrel 14 from a hopper supply (not shown) located at the rear of the cylinder C. The plastic material is frictionally worked by mechanical shearing action as it moves forwardly along the flights during the screw rotation. Completely plasticized material flows off the end 18 of the screw to deposit a charge or "shot" in front of the nose while the screw is caused to move rearwardly against some predetermined pressure. When the charge is fully prepared—an excess beyond that required to fill the mold cavities and the passageways—the screw 16 is forced axially in a forward direction to inject the shot through the sprue bushing B and into the mold. As shown in FIG. 2, the excess defines a cushion 24 between the screw nose 18 and the tapered nozzle bore. Valve pin B1 which is slidably supported within the sprue passageway 26 acts as a closure for port 28 and permits full injection pressure to be developed on the shot being charged into the mold.

Valve pin B1 is thereafter lowered into retracted position within sprue passageway 26 below the level of purge port 28. With the port 28 open, the passageway 26 communicated with the exterior whereby the cushion 24 can be expelled through the open port as shown in FIG. 3.

The nose 18 of the screw 16 is now in close complementary engagement with the tapered nozzle orifice to eject any plug or cushion of material therein into the sprue passageway 26. When the pin B1 is again elevated into a position in which the port 28 is closed, a fresh charge of plastic can be injected under full pressure into the mold cavity during the next molding cycle, again a new cushion of excess material being provided in front of the nose 18 to insure a full shot. Since the cushion 24 is purged from the nozzle every cycle, there can be no build-up of cured or partially cured layers of thermosetting material within the nozzle 12.

The press A is otherwise fully conventional including a stationary lower platen 30 and an upper movable platen 32 vertically displacable with respect thereto. Upper heating platen 34 with heating elements 36 contained therein is rigidly suspended from the movable platen 32 by bolsters or legs 38 using suitable bolts. Lower heating platen 40 with heating elements 42 is similarly rigidly bolted to the lower stationary platen by bolster plates 44. Upper mold plate 46 is attached to the movable platen 34 by bolts 48 and defines a plunger cooperating with a mold cavity in lower mold plate 50. The lower mold plate 50 is affixed to the stationary heating platen 40 by bolts 52. Guide pins 54 upwardly projecting from the lower mold plate 50 register accurately within bushings in the upper mold plate 46 to insure precise alignment of the mold when it closes.

The mold cavity communicates with the sprue passageway 26 through a gate 56 and sprue channels 58 oriented along the parting line of the upper and lower mold plates. The sprue bushing B is secured to the front vertical surface of the stationary lower mold section by means of suitable cap screws 60 extending through counter bored holes 62 in the bushing B and threadedly engaging tapped holes in the lower mold plate. Thus sprue orifice 64 formed in the center of concave surface 22 allows the plastic material injected from the nozzle 12, which is in abutment with sprue bushing B, to enter into the sprue passageway 26 and thence into the mold cavity via the channels 58.

Ejector pins 66 vertically extend through the lower heating platen 40 and project upwardly to a position flush with the mold cavity in plate 50. A runner ejector pin 68 also extends vertically through the lower heating platen 40 and mold plate 50 to a position adjacent the gate 56. The mold and runner ejectors 66 and 68 are attachable at their lower ends to an ejector pin plate 70 vertically reciprocable above the stationary platen 30. The pin plate 70 is mounted on vertical supports 72 which freely pass through the stationary platen 30 and are coupled to a yoke 74. The yoke 74 is affixed to and is vertically reciprocable with piston rod 76 and piston rod 76 connects with piston 78 vertically actuated within ejection cylinder 80. Thus, with hydraulic fluid pumped into the ejection cylinder 80 below the piston 78, the mold and runner ejectors 66 and 68 are caused to be elevated and knock out the molded part and runners from the now open mold plates.

It is also to be observed that the sprue bushing valve pin assembly B1 is similarly connected to the ejector piston rod 76 and therefore may perform the additional function of ejecting sprue from passageway 26 as well as the valve function with respect to purge port 28. The pin assembly B1 includes valve rod or pin 82 which is reciprocable within passageway 26. A collar 86 threadedly engaged over piston rod 88 couples the pin 82 thereto by way of shoulder 90. Piston rod 88 is guided by bearing 84 in lower stationary platen 30, and the lower end of piston rod 88 is attached to piston 92 vertically reciprocable in purge pin cylinder 94. The purge pin cylinder 94 is mounted upon the same ejection yoke 74 which causes knock-out of the molded part and runners. Accordingly, the pin 82 has three positions: (1) a lower position in which purge port 28 is open when piston 92 is at the bottom of its stroke in cylinder 94, (2) a medial position in which piston 92 is at the upper portion of its stroke wherein the top of pin 82 is situated between orifice 64 and purge port 28 such that the latter is closed, and (3) in knock-out position when the ejection piston 78 is raised within cylinder 80 so as to elevate yoke 74 and cylinder 94 to eject the sprue in passageway 26 along with the molded ports. In accordance with customary molding practice for maximum production, both th purging and ejection portions of the cycle are preferably fully automatic. However, it is also possible that the purging stroke may be manual should such be desired by the molder.

As is apparent from the foregoing description, the mode of operation of the instant invention is as follows. Thermosetting material fed from the hopper is deposited in plasticized condition in front of the screw 16 as it rotates and moves rearwardly against a predetermined back pressure. The piston 92 is raised within the cylinter 94 so that pin 82 closes off purge port 28. An excess charge of plasticized material is prepared over that required to fill the mold cavities and the channels leading thereto. Forward thrust of the screw 16 injects the shot into the closed molds whereby a cushion 24 of material is retained in nozzle 12 in front of the screw nose 18, as shown in FIG. 2. Some predetermined time after the molds have been filled, the purge port 28 is opened by retraction of the piston rod 88 in its cylinder 94—i.e., lowering of pin 82 within the sprue passageway 26. Since injection pressure is still on the screw 16, the cushion 24 will be squeezed by the nose 18 to cause the excess to be expelled by drooling through the open purge port 28. After the material has cured within the molds, the two halves are separated. Automatic elevation of the ejection piston 78 enables the ejection pins 66 and 68 to knock out the molded part and the runners while upward motion of the entire assembly B1 causes the pin 82 to simultaneously knock out the sprue contained in passageway 26. The cycle is repeated for subsequent injections, and it is easily seen that cushion-on-cushion build up is effectively prevented so as to avoid short shots or nozzle plugging.

Although this invention has been described in considerable detail, such description is intended as being illustrative rather than limiting since the invention may be variously embodied without departing from the spirit thereof, and the scope of the invention is to be determined as claimed.

What I claim is:

1. In an injunction molding apparatus having an extrusion nozzle injecting a charge of plastic material into mold cavities through a sprue bushing, a purge port in said sprue bushing spaced from the orifice thereof and communicating with the sprue passageway, and valve means for selectively opening and closing said purge port to allow injection of a shot under full pressure into the cavities when said purge port is closed and to permit a cushion of plastic material formed in the nozzle in advance of the screw to be expelled from the purge port when open.

2. The apparatus of claim 1 wherein said valve means comprises a reciprocable pin.

3. The apparatus of claim 2 wherein the pin is vertically reciprocable.

4. The apparatus of claim 2 wherein the reciprocable pin further constitutes an ejection means for knock out of the sprue.

5. The apparatus of claim 4 wherein the pin is displacable in the sprue passage from a position immediately below the sprue orifice to a position immediately below the purge port.

6. The apparatus of claim 5 wherein the purge port extends downwardly and outwardly from the passage to the exterior of said sprue bushing.

7. The apparatus of claim 1 wherein said valve means are automatically actuated a predetermined time after completion of the injection stroke.

8. The apparatus of claim 1 wherein the valve means are manually actuated.

References Cited

UNITED STATES PATENTS

| | | |
|---|---|---|
| 2,304,461 | 12/1942 | Knowles. |
| 3,247,304 | 4/1966 | Ninneman _____ 18—30X |

H. A. KILBY, JR., Primary Examiner